United States Patent
Hsu

(10) Patent No.: US 8,596,505 B2
(45) Date of Patent: Dec. 3, 2013

(54) DETACHABLE ACCESSORY CARRIER FOR BICYCLE

(75) Inventor: Ching-Chung Hsu, Taichung (TW)

(73) Assignees: Flybikes S.L., Vigo (ES); David Quesada, Vigo (ES)

(*) Notice: Subject to any disclaimer, the term of this patent is extended or adjusted under 35 U.S.C. 154(b) by 17 days.

(21) Appl. No.: 13/199,715

(22) Filed: Sep. 7, 2011

(65) Prior Publication Data

US 2012/0125962 A1 May 24, 2012

(30) Foreign Application Priority Data

Nov. 18, 2010 (TW) ................................ 99222406 U

(51) Int. Cl.
*B62J 7/00* (2006.01)
*B62J 11/00* (2006.01)
*B62J 9/00* (2006.01)

(52) U.S. Cl.
USPC ............ 224/414; 224/412; 224/419; 224/425

(58) Field of Classification Search
USPC ................. 224/414, 412, 419, 425, 430, 426; 248/230.6
See application file for complete search history.

(56) References Cited

U.S. PATENT DOCUMENTS

| | | | | |
|---|---|---|---|---|
| 4,434,679 A | * | 3/1984 | Shimano | 74/491 |
| 4,998,652 A | * | 3/1991 | Champagne | 224/414 |
| 5,383,706 A | * | 1/1995 | Chen | 297/215.15 |
| 5,775,652 A | * | 7/1998 | Crawshaw et al. | 248/230.6 |
| 5,827,282 A | * | 10/1998 | Pennig | 606/54 |
| 6,588,637 B2 | * | 7/2003 | Gates et al. | 224/546 |
| 6,942,131 B2 | * | 9/2005 | Trautman et al. | 224/414 |
| 7,988,175 B2 | * | 8/2011 | White | 280/281.1 |
| 8,240,528 B2 | * | 8/2012 | Barnes | 224/419 |
| 2004/0112167 A1 | * | 6/2004 | Ying | 74/551.3 |

* cited by examiner

*Primary Examiner* — Nathan J Newhouse
*Assistant Examiner* — Lester L Vanterpool
(74) *Attorney, Agent, or Firm* — Charles E. Baxley

(57) ABSTRACT

A detachable accessory carrier for bicycle includes a fixed seat, a positioning member and a fastener. The fixed seat has a positioning portion and a fixing portion communicated mutually. The positioning member has an inserting portion that includes a propping portion corresponding to the fixing portion so that when the inserting portion of the positioning member is assembled to the positioning portion of the fixed seat, the fastener can be coupled with the fixing portion and abut against the propping portion of the positioning member, thereby attaching the detachable accessory carrier reliably to the frame tube of the bicycle. The detachable accessory carrier can be partially detached with only the fixed seat left on the frame tube of the bicycle. The fixed seat has a rim conforming to a periphery of the frame tube so it will not interfere with the cyclist's riding or scrape the cyclist's skin.

9 Claims, 5 Drawing Sheets

DETACHABLE ACCESSORY CARRIER FOR BICYCLE

BACKGROUND OF THE INVENTION

1. Technical Field

The present invention relates to bicycle parts, and more particularly, to a detachable accessory carrier for a bicycle, wherein the detachable accessory carrier can be easily attached to and detached from the frame tube of the bicycle.

2. Description of Related Art

Generally, for minimizing unnecessary burdens and thereby maximizing cyclists' performance, BMX (bicycle motocross) bikes are made as brief as possible. As can be seen in the market, BMX bicycles, unlike bicycles made for other purposes, usually have no accessory carriers for carrying accessories such as a water bottle. This is inconvenient for normal riding and limits a BMX bicycle to a single purpose. On the other hand, track bicycles typically come without brakes, so they have to be additionally equipped with a brake set for normal riding.

For attaching additional accessories to such specialized bicycles for facilitating their normal use, it is necessary to provide an accessory carrier that can be easily attached to and detached from a bicycle frame, wherein when detached from the bicycle frame, the accessory carrier only leaves a fixed seat conformable to the periphery of the bicycle frame, so the fixed seat will not interfere with the cyclist's riding or scrape the cyclist's skin.

SUMMARY OF THE INVENTION

Therefore, the present invention proposes a detachable accessory carrier for a bicycle. The detachable accessory carrier can be easily attached to a frame tube of the bicycle for carrying an external object. The detachable accessory carrier can be detached from the frame tube with only a fixed seat left on the frame tube. Since the fixed seat is shaped conforming to the periphery of the bicycle frame, it will not interfere with the cyclist's riding or scrape the cyclist's skin.

According to the present invention, the detachable accessory carrier is composed of a fixed seat, a positioning member and a fastener. The fixed seat has a positioning portion and a fixing portion communicated mutually. The positioning member has an inserting portion that includes a propping portion corresponding to the fixing portion so that when the inserting portion of the positioning member is assembled to the positioning portion of the fixed seat, the fastener can be coupled with the fixing portion and abut against the propping portion of the positioning member, thereby detachably fixing the whole detachable accessory carrier reliably to the frame tube of the bicycle.

The effect primarily achieved by the present invention is that the detachable accessory carrier can carry an external object for meeting a cyclist's need and can be mostly detached from the frame tube of the bicycle with only the fixed seat left on the frame tube so the fixed seat conforming to the periphery of the bicycle frame can ensure the cyclist from operational interference and skin scrape.

In addition, according to the present invention, the positioning portion and the fixing portion have axes thereof intersecting in an angle ranging between 0 and 90 degrees, so the fixed seat can be downsized.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
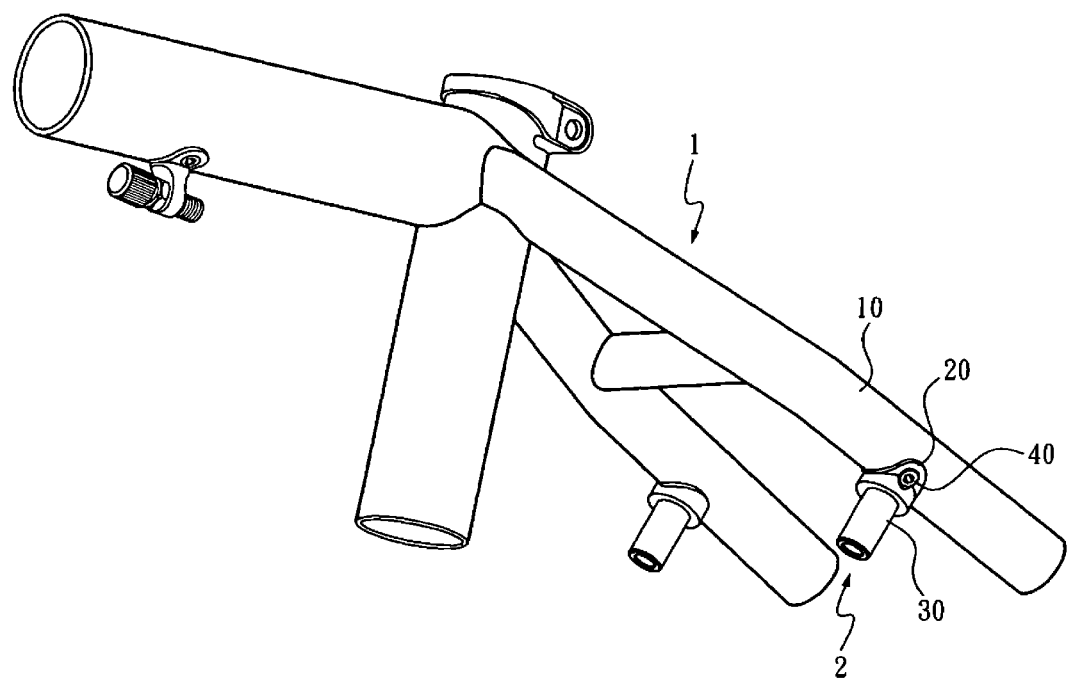
FIG. 1 is a perspective view of detachable accessory carriers of the present invention assembled to a bicycle frame.
Figure 2:
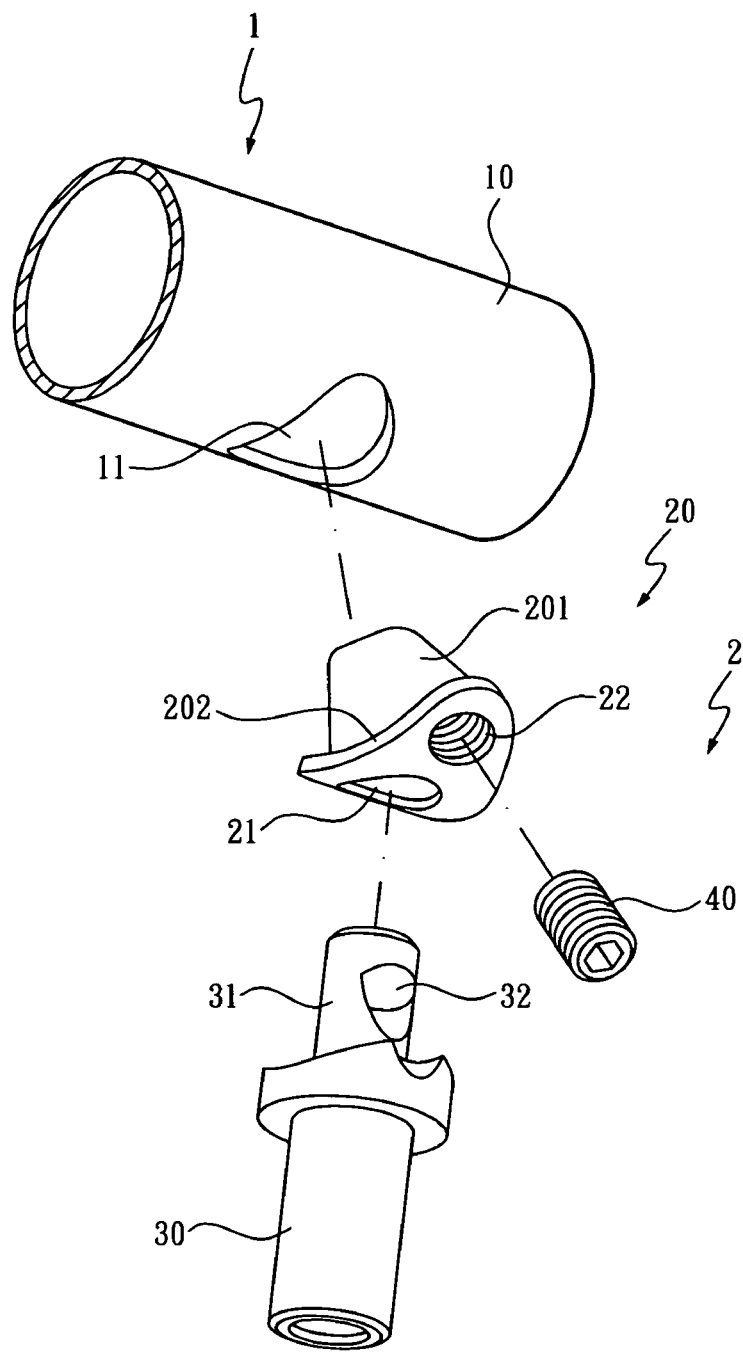
FIG. 2 is an exploded view of the detachable accessory carrier according to one embodiment of the present invention.

Referring to FIG. 1 and FIG. 2, a detachable accessory carrier 2 according to one embodiment of the present invention is to be assembled to a tube 10 of a bicycle frame 1. The detachable accessory carrier 2 is composed of a fixed seat 20, a positioning member 30 and a fastener 40.

The bicycle frame 1 has the tube 10 pre-bored with a radially opened bore 11. The fixed seat 20 includes a main body 201 shaped to be received in the bore 11 of the frame tube 10. The main body 201 has a rim 202 shaped according to a periphery of the frame tube 10 of the bicycle for facilitating close contact between the main body 201 and serving to hold the main body 201 partially exposed at the periphery of the frame tube 10. The fixed seat 20 is fixed to the tube 10 by means of welding. The fixed seat 20 has a positioning portion 21 in the form of a non-threaded hole and a fixing portion 22 in the form of a threaded hole extending in different radial directions of the frame tube 10 and communicating with each other. The positioning portion 21 and fixing portion 22 have axes thereof intersecting in an angle ranging between 0 and 90 degrees while the positioning portion 21 and the fixing portion 22 are internally communicated with each other.

The positioning member 30 has one end formed as an inserting portion 31 that has a columnar shape, so that the inserting portion 31 can be inserted to the hole formed on the positioning portion 21 in the radial direction of the frame tube 10 where the positioning portion 21 extends. The inserting portion 31 includes a propping portion 32 that corresponds to the fixing portion 22 when the inserting portion 31 is set in the positioning portion 21.

The fastener 40 may be a screw or a threaded bolt that can be coupled with the fixing portion 22 in a screwed manner.

Figure 3:
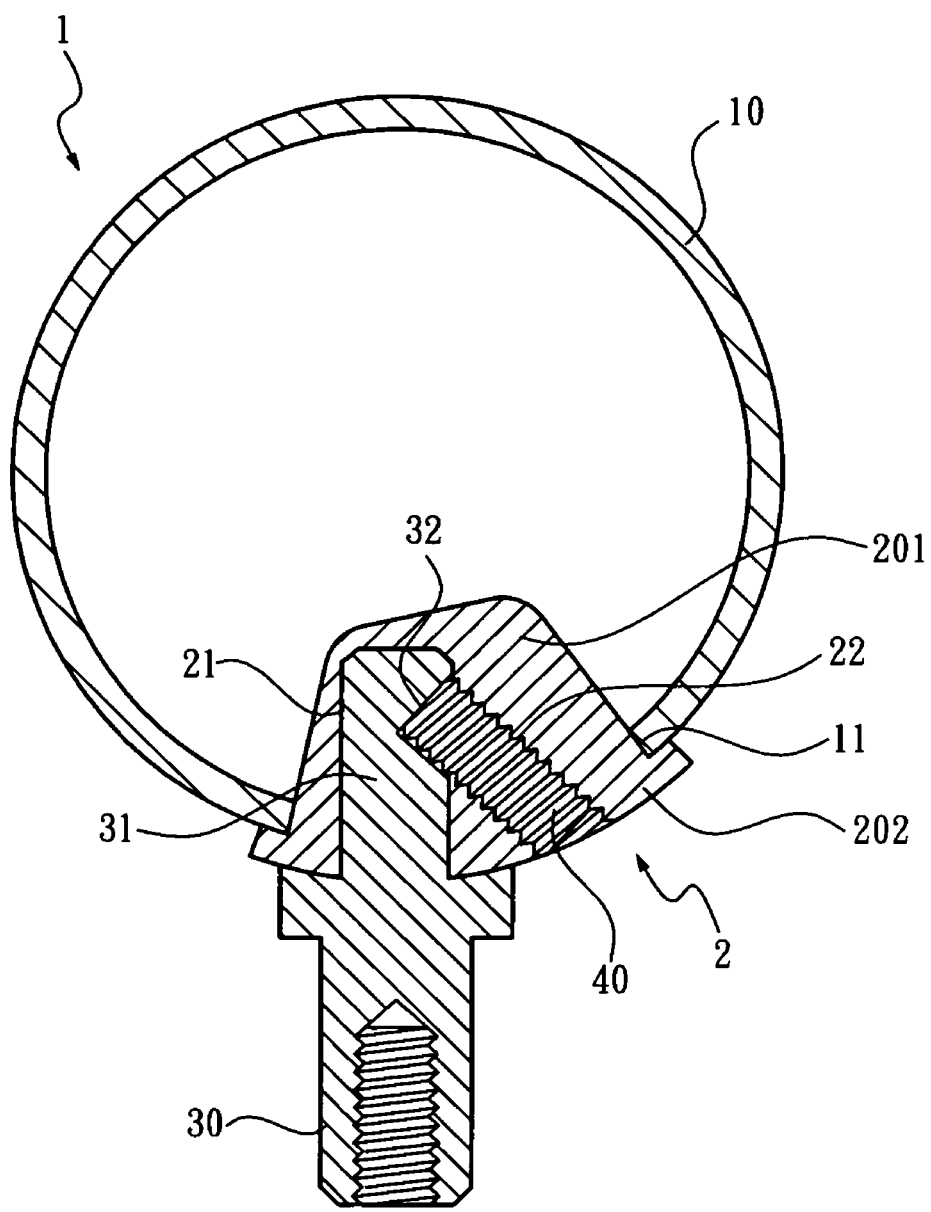
FIG. 3 is a cross-sectional view of the detachable accessory carrier of FIG. 2.

Now referring to FIG. 3, the detachable accessory carrier 2 has the inserting portion 31 inserted in the positioning portion 21 in the radial direction of the frame tube 10, and then the fastener 40 is screwed into the fixing portion 22 to the extent that the fastener 40 abuts against the propping portion 32, so that the positioning member 30 is firmly assembled to the fixed seat 20 in virtue of the fastener 40. Since the positioning portion 21 and the fixing portion 22 have their axes intersecting in an acute angle, the fixed seat 20 can be downsized.

Figure 4:
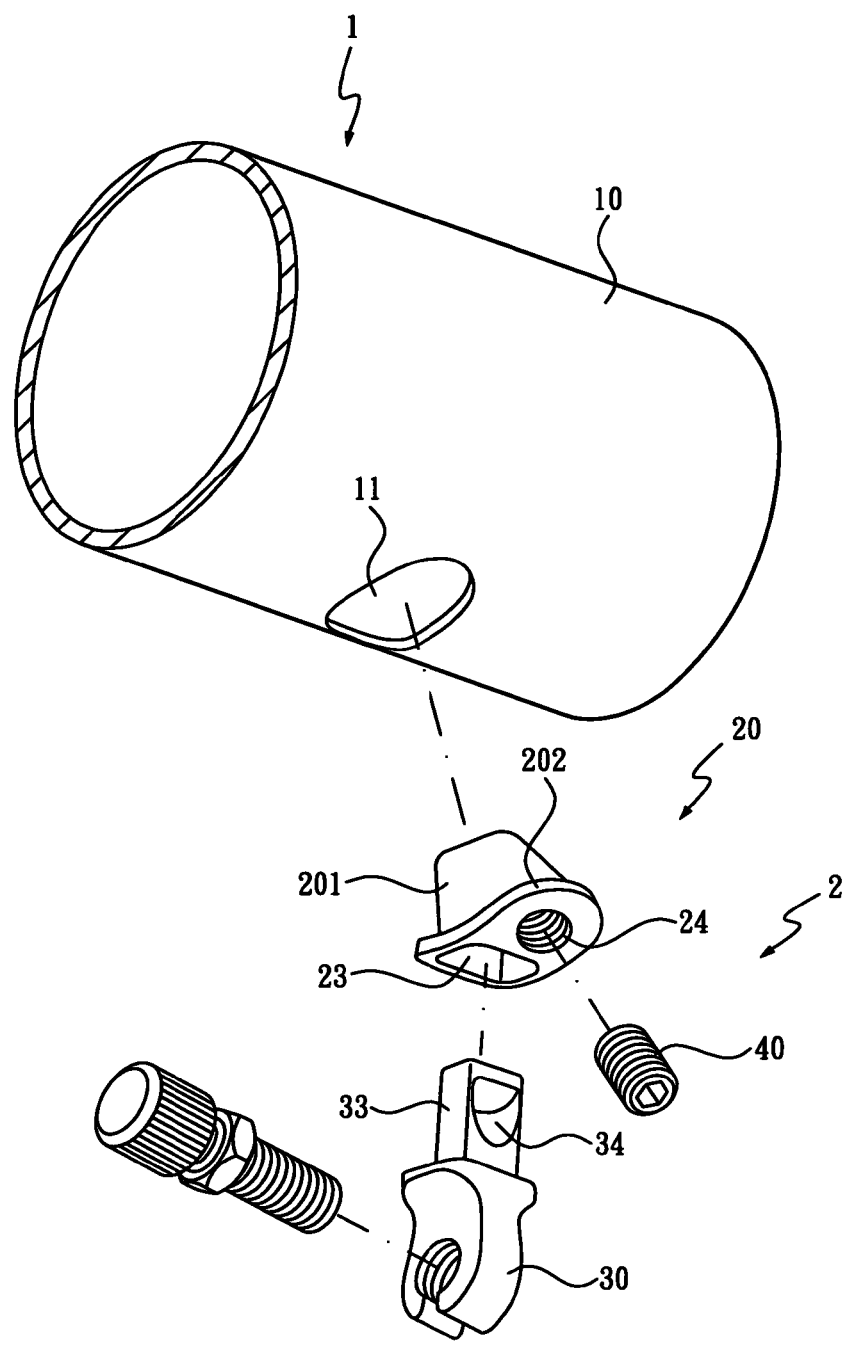
FIG. 4 is an exploded view of the detachable accessory carrier according to another embodiment of the present invention.

According to the present invention, at an end of the positioning member 30 opposite to the end having the inserting portion 31, a bracket of a brake set (as shown in FIG. 2), a gripper for a cable (as shown in FIG. 4) or a bottle cage (not shown) is provided for carrying a brake set, a braking cable or a bottle cage. Other accessories may be also carried so the carrier of the present invention is versatile. When the attached accessory is desired to be removed, the detachable accessory carrier 2 can be removed as well by unscrewing the fastener 40 and drawing the inserting portion 31 out of the fixed seat 20. As the rim 202 of the fixed seat 20 is shaped conforming to the periphery of the frame tube 10, the fixed seat 20 closely fits the surface of the frame tube 10 with a boundary therebetween smooth, so as to eliminate the risk of interfering the cyclist's riding or scraping the cyclist's skin.

Figure 5:
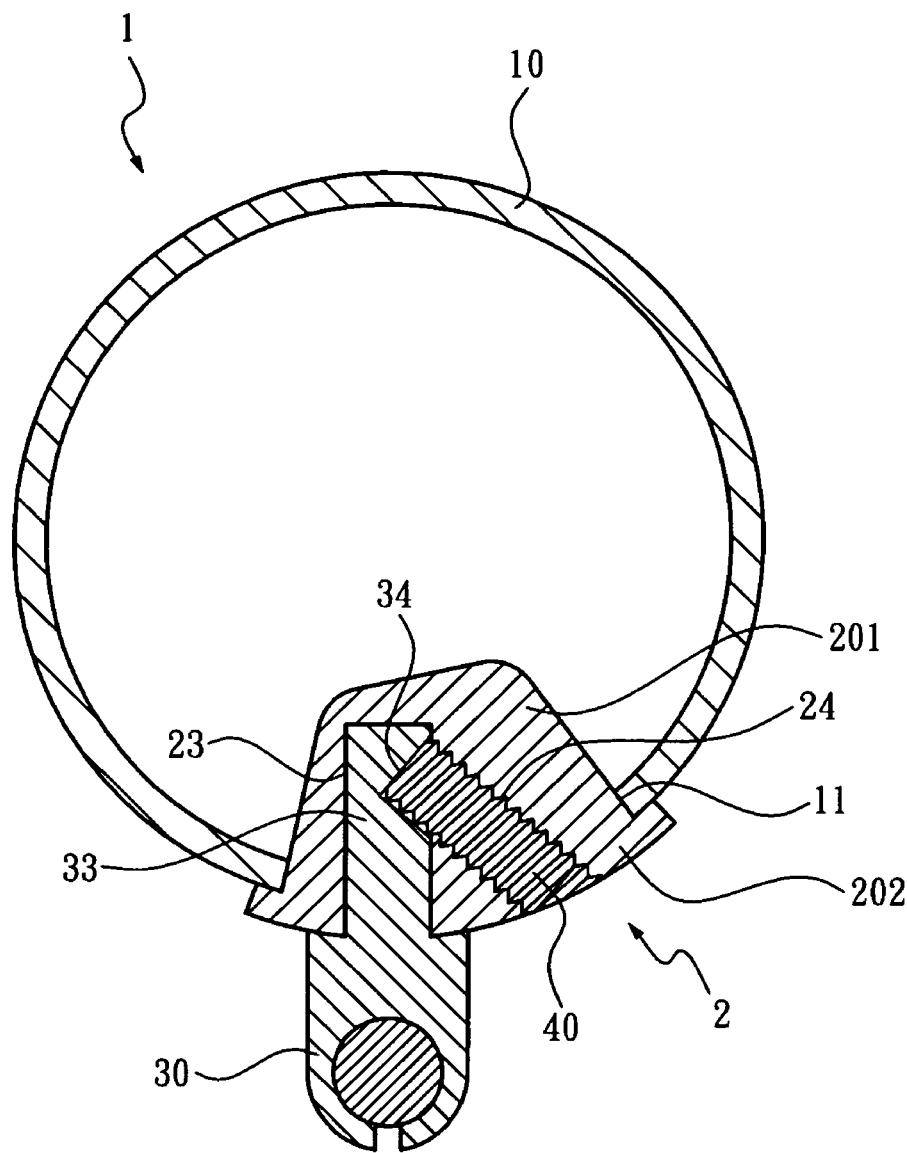
FIG. 5 is a cross-sectional view of the detachable accessory carrier of FIG. 4.

As shown in FIG. 4 and FIG. 5, in another embodiment of the present invention, the positioning member 30 has an inserting portion 33 formed with a prismatic shape. The inserting portion 33 includes a propping portion 34 that corresponds to the fixing portion 24 when the inserting portion 33 is set in the positioning portion 23, so that the inserting portion 33 can be placed in the hole of the positioning portion 23 and then fixed to the fixed seat 20 when the fastener 40 is assembled to the fixing portion 24 and abuts against the propping portion 34. Thereby, the positioning member 30 is combined firmly with the fixed seat 20 through the fastener 40. The prismatic inserting portion 33 prevents the positioning member 30 from rotating or swinging in the fixed seat 20, so as to further facilitate aligning the propping portion 34 with the fastener 40, thereby making the present invention more manageable.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A detachable accessory carrier of a bicycle, the bicycle having a frame tube bored with a bore, and the detachable accessory carrier comprising:
    a fixed seat being fixed to the bore and having a positioning portion and a fixing portion extending in different radial directions of the frame tube and communicating with each other, wherein the fixed seat comprises a main body and the main body is inlaid within the bore formed on the frame tube of the bicycle;
    a positioning member having an inserting portion at one end thereof, wherein the inserting portion is configured to be inserted to the positioning portion in the radial direction of the frame tube where the positioning portion extends, and includes a propping portion that corresponds to the fixing portion when the inserting portion is set in the positioning portion;
    a fastener being configured to couple with the fixing portion of the fixed seat and abut against the propping portion of the positioning member.

2. The detachable accessory carrier as claimed in claim 1, wherein the main body has a rim shape conforming to a periphery of the bore formed on the frame tube of the bicycle for facilitating close contact between the main body and the frame tube.

3. The detachable accessory carrier as claimed in claim 2, wherein the positioning portion of the fixed seat is a non-threaded hole and the fixing portion of the fixed seat is a threaded hole.

4. The detachable accessory carrier as claimed in claim 3, wherein the positioning portion and the fixing portion have axes thereof intersecting in an angle ranging between 0 and 90 degrees while the positioning portion and the fixing portion are internally communicated with each other.

5. The detachable accessory carrier as claimed in claim 1, wherein the inserting portion of the positioning member has a columnar shape.

6. The detachable accessory carrier as claimed in claim 1, wherein the inserting portion of the positioning member has a prismatic shape.

7. The detachable accessory carrier as claimed in claim 1, wherein the positioning member has an opposite end thereof provided with a bracket for a brake set of the bicycle.

8. The detachable accessory carrier as claimed in claim 1, wherein the positioning member has an opposite end thereof provided with a gripper for a cable of the bicycle.

9. The detachable accessory carrier as claimed in claim 1, wherein the positioning member has an opposite end thereof provided with a bottle cage.

* * * * *